United States Patent [19]

Goan

[11] Patent Number: 4,487,863

[45] Date of Patent: Dec. 11, 1984

[54] REINFORCED POLYESTER BASED RESIN SYSTEM AND METHOD OF FABRICATION

[75] Inventor: John C. Goan, Johnson City, Tenn.

[73] Assignee: Great Lakes Carbon Corporation, New York, N.Y.

[21] Appl. No.: 443,752

[22] Filed: Nov. 22, 1982

[51] Int. Cl.³ .............................................. C08L 67/06
[52] U.S. Cl. .................................... 523/512; 523/521; 523/527; 525/38; 525/46
[58] Field of Search ..................... 525/38, 46; 523/512, 523/521, 527, 514, 500

[56] References Cited

U.S. PATENT DOCUMENTS

| | | | |
|---|---|---|---|
| 3,953,395 | 4/1976 | Farone | 525/46 |
| 3,969,560 | 7/1976 | Lewis | 525/38 |
| 4,069,193 | 1/1978 | Vargiu | 523/521 |
| 4,293,686 | 10/1981 | Gardner | 523/527 |
| 4,316,835 | 2/1982 | Gardner | 523/512 |

*Primary Examiner*—John C. Bleutge
*Assistant Examiner*—Patricia Short
*Attorney, Agent, or Firm*—R. Laddie Taylor

[57] ABSTRACT

Amino substituted acrylamide monomer is utilized as a coupling agent for reinforcing fibers and polyester base resin matrix in the production of thermosetting resin systems to enhance the bonding characteristics of the resin with the fiber while improving the flexural strength of the final composite structure.

6 Claims, No Drawings

REINFORCED POLYESTER BASED RESIN SYSTEM AND METHOD OF FABRICATION

BACKGROUND OF THE INVENTION

1. Field of the Invention

The invention relates to composite structures comprised of reinforcing fibers and a thermosetting resin matrix and means for enhancing the bonding characteristics of the fiber and resin while improving the flexural strength and shear strengths of such composites.

2. Description of the Prior Art

Polyester base resins are derived from the reaction of a diol or glycol, such as propylene glycol, with a mixture of two different dicarboxylic acids. One of these acids is unsaturated and is customarily maleic or fumaric acid, and the other acid is usually either phthalic acid or isophthalic acid. The resulting reaction product is a relatively low molecular weight linear polyester having reactive partially unsaturated structure. The final resin curing process consists of a peroxide-catalyzed reaction with a reactive unsaturated monomer to generate a cross-linked thermoset structure.

Styrene is the most often used monomer in thermoset polyesters. Other monomers sometimes used include vinyl toluene, methyl acrylate, divinyl benzene, diallylphthalate and triallyl cyanurate. There are a large variety of peroxides useful in curing polyesters including, among many others, t-butyl perbenzoate, benzoyl peroxide, 2-butanone peroxide, t-butyl peroctoate and 1,1-bis(t-butyl peroxy)cyclohexane.

Reinforcing fibers known in the art as being useful for providing strength and durability to resin matrix materials include those of carbon, glass, silicon carbide, boron and quartz. The term fibers is used herein in the generic sense and includes fibers in filament, tow, staple yarn, roving, woven or chopped configuration. Likewise, the term carbon fibers is used generically, and includes both graphite fibers and amorphous carbon fibers.

Composite structures formed from polyester base resins and reinforcing fibers, especially of carbon, often exhibit low interlaminar composite shear strength, which is a measure of interfacial bonding between the fibers and the resin, because of relatively poor adhesion between the fibers and the matrix.

In the past, improved bonding has been attempted by coating the surfaces of carbon fibers or the like with various metals (e.g., tantalum), metal carbides (e.g., whiskers of silicon carbide) and nitrides. These coating processes are inherently expensive and it is difficult to control the thickness and homogeneity thereof. Further, these coatings do not enhance the flexural or shear strengths of the final composite structure.

Additionally, various surface treatments known in the art have been applied to carbon fibers or the like to improve their bonding characteristics. Such treatments, however, are conventionally oxidative or corrosive etches of various kinds, and include treatment with air, ozone, concentrated nitric acid, chromic-sulfuric acid, nitrogen dioxide and the like. Although these treatments do tend to improve composite shear strength, the reactants adversely affect the internal portions of the fibers and actually degrade other fiber and/or composite physical properties. Furthermore, surface treatments of this nature are expensive, relatively inconvenient to apply to the fibers, often pollute the atmosphere, and can be hazardous to the health of workers in the area where the treatment is taking place.

SUMMARY OF THE INVENTION

It is an object of the invention to provide means for enhancing the bonding quality of a polyester base resin material with reinforcing fibers.

It is a further object of the invention to provide means for improving the bonding strength of fiber-reinforced polyester base resin composite structures while improving the flexural and shear strengths of composites.

These and other objects of the invention are achieved by the addition of an amino substituted acrylamide monomer to the matrix of a thermosetting resin system comprising a polyester base resin matrix and reinforcing fibers in an amount effective to improve the bonding strength of the matrix to the reinforcing fibers.

DETAILED DESCRIPTION OF THE INVENTION

Amino substituted acrylamide monomer has the general structure

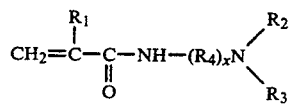

where $R_1$, $R_2$ and $R_3$ are each selected from the group consisting of H and compounds of the formula $C_nH_{2n+1}$, where n is a numeral in the range of 1 to about 5;

$R_4$ is selected from the group consisting of $CH_2$ and aromatic or cycloaliphatic segments; and x is a numeral in the range of 1 to 5.

Representative examples of suitable compounds are
3-dimethylaminopropyl methyacrylamide
3-methylaminopropyl methacrylamide
3-diethylaminopropyl acrylamide
3-diethylaminopropyl methacrylamide
2-dimethylamino acrylamide
4-dimethylaminocyclohexyl methacrylamide
3-dihydroxyethylaminopropyl acrylamide
3-isopropylaminopropyl methacrylamide It is preferable that the amount of the amino substituted acrylamide monomer added to the resin system is in the range of about 5 to 30 wt. %, based on the weight of the polyester base resin matrix.

DESCRIPTION OF THE PREFERRED EMBODIMENT

The preferred embodiment of the invention will now be presented by the following non-limiting example:

To demonstrate the efficiency of amino substituted acrylamide monomers as a coupling agent or modifier for thermoset polyester resin matrices, two batches of resin were made up, designated A and B. The compositions are shown below.

Resin Composition A 100 parts by weight MR 14029 polyester resin, supplied by U.S.S. Chemicals 2 parts by weight t-butyl perbenzoate curing agent, supplied by Matheson, Coleman and Bell Co.

Resin Composition B 90 parts MR 14029 polyester resin
2 parts t-butyl perbenzoate
10 parts dimethylaminopropyl methacrylamide (DMAPMA) supplied by Texaco Chemical Co.

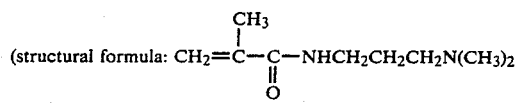

The two resin compositions are identical, except that in Resin B 10% of the polyester resin is replaced by the DMAPMA monomer.

Twenty gram samples of resin compositions A and B were separately combined with about 24 grams of unsized Fortafil ®3 carbon fiber tow, a surface-treated fiber produced by Great Lakes Carbon Corporation, and made into prepreg samples having dimensions of about 51 cm long, 31 cm wide and 0.025 cm thickness (20 in.×12 in.×0.01 in.) according to methods well known in the art. Twelve-ply unidirectional test panels having dimensions of 12.7 cm long, 7.6 cm wide and 0.15 cm thickness (5 in.×3 in.×0.06 in.) were then fabricated by compression molding at 170° C. for 30 minutes. Test bars were cut from each panel having dimensions of about 7.6 cm long, 1.3 cm wide and 0.15 cm thickness (3 in.×0.5 in.×0.06 in.) for flexural testing, and 1.9 cm long, 0.6 cm wide and 0.15 cm thickness (0.75 in.×0.25 in.×0.06 in.) for interlaminar shear strength testing.

The bars were then tested for flexural strength and shear strength by standard ASTM procedures well known in the art. For the flexural strength determination according to ASTM method D-790-71, the sample was loaded in a three point configuration on a 5.1 cm (2 inch) span, the support and loading surfaces being the radial faces of 1.3 cm (0.5 inch) diameter steel pins, giving a span to depth ratio of 33 to 1. Stress was applied until failure, giving a linear stress-strain curve from which the ultimate flexural strength was calculated. For the determination of interlaminar shear strength according to ASTM method D-2344-76, a second sample was loaded in a three-point configuration on 0.6 cm (0.25 inch) centers consisting of the radial surfaces of 0.3 cm (0.125 inch) diameter steel pins, providing a span to depth ratio of 4.2 to 1. The bar was stressed to failure, the magnitude of the force required being used to compute the interlaminar shear strength.

Average test results obtained are shown below.

| Resin Designation | Composite Properties | |
|---|---|---|
| | Interlaminar Shear Strength | Flexural Strength |
| A | 527 kg/cm² (7500 psi) | 12,866 kg/cm² (183,000 psi) |
| B | 647 kg/cm² (9200 psi) | 15,327 kg/cm² (218,000 psi) |

Clearly the modified resin system B has afforded higher composite flexural and shear strengths. The level of improvement in flexural strength, about 20%, illustrates significant improvement in translation of fiber strength into composite strength. That this flexural strength improvement is a consequence of fiber to resin bond improvement is shown by the 22% increase in interlaminar shear strength, which is a standard test of interfacial bonding.

It is apparent that the modification of the polymer resin by the use of the amino functional acrylamide monomer coupling agent has resulted in a significant increase in bonding of the reinforcing fiber to the matrix resin.

While the invention has been described in detail and with reference to a specific embodiment thereof, it will be apparent to one skilled in the art that various changes and modifications can be made therein without departing from the scope and spirit thereof, and, therefore, the invention is not intended to be limited except as indicated in the appended claims.

What is claimed is:

1. In a thermosetting resin system comprising an unsaturated polyester base resin matrix and reinforcing fibers, the improvement comprising the addition of 5 to 30 wt. %, based on the weight of the matrix, of an amino substituted acrylamide monomer having the general formula

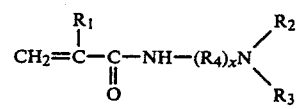

where
  $R_1$, $R_2$ and $R_3$ are each selected from the group consisting of H and compounds of the formula $C_nH_{2n+1}$, where n is a numeral in the range of 1 to about 5;
  $R_4$ is selected from the group consisting of $CH_2$ and aromatic or cycloaliphatic segments; and
  x is a numeral in the range of 1 to 5,
to said matrix to improve the bonding strength of said matrix to said reinforcing fibers.

2. The thermosetting resin system of claim 1, wherein the reinforcing fibers are selected from the group consisting of carbon, glass, SiC, boron and quartz.

3. The thermosetting resin system of claim 2 wherein the reinforcing fibers are carbon fibers.

4. A method for improving the bonding of an unsaturated polyester base resin matrix to reinforcing fibers incorporated in said matrix which comprises adding to said matrix 5 to 30 wt. %, based on the weight of the matrix, of an amino substituted acrylamide monomer having the general formula

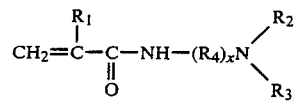

where
  $R_1$, $R_2$ and $R_3$ are each selected from the group consisting of H and compounds of the formula $C_nH_{2n+1}$, where n is a numeral in the range of 1 to about 5;
  $R_4$ is selected from the group consisting of $CH_2$ and aromatic or cycloaliphatic segments; and
  x is a numeral in the range of 1 to 5,
to said matrix to improve the bonding strength of said matrix to said reinforcing fibers.

5. The method of claim 4, wherein the reinforcing fibers are selected from the group consisting of carbon, glass, SiC, boron and quartz.

6. The method of claim 5 wherein the reinforcing fibers are carbon fibers.

* * * * *